(12) United States Patent
Kimura et al.

(10) Patent No.: US 9,352,481 B2
(45) Date of Patent: May 31, 2016

(54) CUTTING DEVICE

(71) Applicant: MAKITA CORPORATION, Anjo-shi, Aichi (JP)

(72) Inventors: Yoshihiro Kimura, Anjo (JP); Syuji Aoyama, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 107 days.

(21) Appl. No.: 14/514,502

(22) Filed: Oct. 15, 2014

(65) Prior Publication Data

US 2015/0114195 A1 Apr. 30, 2015

(30) Foreign Application Priority Data

Oct. 31, 2013 (JP) ................. 2013-226932

(51) Int. Cl.
*B27B 27/04* (2006.01)
*B27B 29/02* (2006.01)
*B23D 45/04* (2006.01)
*B23D 45/12* (2006.01)
*B23D 47/06* (2006.01)

(52) U.S. Cl.
CPC .............. *B27B 27/04* (2013.01); *B23D 45/042* (2013.01); *B23D 45/12* (2013.01); *B23D 47/06* (2013.01); *B27B 29/02* (2013.01); *Y10T 83/7487* (2015.04); *Y10T 83/758* (2015.04)

(58) Field of Classification Search
CPC .............. Y10T 83/7567; Y10T 83/758; Y10T 83/7487; Y10T 83/5669; Y10T 83/5815; Y10T 83/7593; Y10T 83/7607; Y10T 83/7613; Y10T 83/762; Y10T 83/7627; B23D 47/06; B23D 47/04; B23D 45/042; B23D 45/12; B27B 27/00; B27B 27/04; B27B 27/06; B27B 27/08; B27B 27/10; B27B 29/00; B27B 29/02
See application file for complete search history.

(56) References Cited

U.S. PATENT DOCUMENTS

| | | | | | |
|---|---|---|---|---|---|
| 2,413,016 | A | * | 12/1946 | Wiken ................... | B23D 45/044 29/DIG. 68 |
| 5,483,858 | A | * | 1/1996 | Chen ...................... | B23D 47/04 269/303 |
| 5,651,297 | A | * | 7/1997 | Garuglieri ............ | B23D 59/002 83/468.1 |
| 5,720,096 | A | * | 2/1998 | Dorsey ................... | B23D 47/04 269/204 |
| 6,260,460 | B1 | * | 7/2001 | Shibata .................. | B23D 47/04 83/468.3 |
| 2003/0228197 | A1 | * | 12/2003 | Salvaryan ............ | B23D 45/044 407/30 |
| 2007/0295182 | A1 | * | 12/2007 | Stone ..................... | B23D 45/042 83/454 |
| 2013/0160630 | A1 | * | 6/2013 | Groth ..................... | B23D 45/006 83/743 |
| 2014/0318341 | A1 | * | 10/2014 | Fait ......................... | B23D 47/04 83/477 |

FOREIGN PATENT DOCUMENTS

JP A-5-16051 1/1993
JP B2-3676928 7/2005

* cited by examiner

*Primary Examiner* — Phong Nguyen
(74) *Attorney, Agent, or Firm* — Oliff PLC

(57) ABSTRACT

An interposing member is interposed between a base part of the fence plate and a top plate part of a base, and a position of the fence plate is changed on the interposing member. Because of this, deflection etc. of the top plate can be reduced and variation of an operating angle of an operating lever can be reduced when fixing the fence plate to the base.

6 Claims, 14 Drawing Sheets

CUTTING DEVICE

This application claims priority to Japanese patent application serial number 2013-226932, the contents of which are incorporated herein by reference.

BACKGROUND OF THE INVENTION

1. Field of the Invention

Embodiments of the present invention relate to a cutting device mainly for metal machining. In more detail, they relate to a metal cutting chop saw for cutting material as a metal pipe etc.

2. Description of the Related Art

A cutting device for metal machining has an electric motor serving as a drive source, a circular grinding wheel or a chip saw serving as a cutting blade, a base on which a material to be cut is placed, and a tool main body that is vertically movable above the base and supported by the base. Further, the cutting device has a vise device for fixing a material to be cut on an upper surface of the base (a mounting surface of a material to be cut). A cutting device relating to the above is described in Japanese Laid-Open Patent Application No. H05-16051 and Japanese Patent No. 3676928 as prior art.

The vise device has a fence for contacting a material to be cut and positioning the material on the surface of the base. The vise also has a vise main body for fixedly pressing the material to be cut against the fence. The fence can be moved along the surface of the base. Accordingly, a fixing position and direction of the material to be cut can be arbitrarily changed by the vise device.

According to Japanese Laid-Open Patent Application No. H05-16051, in order to move the fence, a fixing screw must be loosened by an appropriate angle in a special manner, for example, using a hand tool such as wrench etc. and the fixing screw must be fastened again. This troublesome operation will be avoided by an invention disclosed in Japanese Patent No. 3676928. Japanese Patent No. 3676928 discloses a structure for fixing a fence without any specific tool (termed a tool-less construction) in which a rotational operation of an operational lever by a specific angle can rapidly change a position of the fence in order to fix the fence.

Compared to a table circular saw for wood machining that is provided with a tool-less construction as described above, a reduction in manufacturing cost may be required in a cutting device for metal machining. Thus, in a cutting device for metal machining, a base on which a material to be cut is placed is mainly manufactured using metal sheet parts such as a bent steel plate due to cost reduction. Because of this, sufficient accuracy in flatness etc. of the upper surface of the base is not necessarily obtained due to welding strains etc. Thus, it may occur that the base is wave-formed with a slight unevenness. As a result, in the case that a position of the fence is changed by applying the above-described tool-less structure to the base made of metal sheet parts, unevenness in a fastening position of the operation lever may occur. In this way, there has been a problem that the operability of the operational lever and usability of the cutting device may be worsened.

Thus, there is a need in the art such that operability of the operational lever is improved when a position of the fence is changed, whereby operability and usability of the cutting device can be improved.

SUMMARY OF THE INVENTION

According to a first aspect of the present invention, there is provided a cutting device for metal machining that may have a base on which a material to be cut is placed, a tool main body that is vertically movable and supported by the base, and a fence that is provided on a top plate part of the base and has a fence surface on a front side of the base for contacting the material to be cut and positioning the material on the top plate part. Further, the fence is configured to be fixed with respect to the base via an interposing member that is interposed between the base and the fence. The interposing member is configured to be fixed with respect to the base by a first fixing member and the fence is configured to be fixed with respect to the interposing member by a second fixing member, whereby the fence is indirectly fixed with respect to the base. Further, a direction of the fence surface is configured to be changed by rotating the interposing member around a rotation axis. The rotation axis is situated on a rear side of the base at an opposite side to the material to be cut with respect to the fence surface.

In the first aspect, the fence is configured to move upon the interposing member by loosening the second fixing member. Thus, even when the top plate part of the base has been warped, deflected, or undulated, the variation of an operating amount of the second fixing member can be reduced or eliminated. Because of this, operability and usability of the fence, and eventually of the cutting device can be improved.

According to certain embodiments of the present invention, a position of the fence in the front and rear directions may be changed by moving the interposing member in the front and rear directions.

In the above aspect, movement of the interposing member in the front and rear directions can accordingly change a position of the fence in the front and rear directions.

In certain embodiments, in a state where the fence is fixed to the interposing member by the second fixing member, the fence may be indirectly positioned on the base by engaging an engaging member provided in the interposing member with the base.

In the above aspect, by engaging the engaging part of the interposing member with the base in a state where the fence is integrally joined to the interposing member, a positioning structure of the fence may also have a function of a so-called positive stop structure. In this case, the first and the second fixing members may also have a function served as engaging members.

In certain embodiments, engaging holes that include a longitudinal groove hole extending in the front and rear directions and a transverse groove hole extending in a direction intersecting with the longitudinal groove hole may be provided in the base. Further, a structure is provided such that the interposing member can be positioned in the front and rear directions by inserting the engaging member into the transverse groove hole.

In the above aspect, a positioning of the interposing member, and eventually of the fence in the front and rear directions may be rapidly performed with improved repeatability. In this respect, operability and usability of the fence, and eventually of the cutting device may be further improved.

In certain embodiments, a first engaging hole and a second engaging hole that respectively include the longitudinal groove hole and the transverse groove hole may be provided, respectively corresponding to the first fixing member and the second fixing member. Further, a position of the transverse groove hole of the first engaging hole matches with a position of the transverse groove hole of the second engaging hole in the front and rear directions.

In the above aspect, the interposing member may be moved in such a way that the fence is rapidly positioned parallel to the front and rear directions at several positions.

In certain embodiments, a biasing member for biasing the fence in a direction in which the engaging member may be entered into a transverse groove hole is provided in either the interposing member or the base.

In the above aspect, the engaging member can be forcibly inserted into a transverse groove hole by a biasing force of the biasing member. Because of this, operability may be further improved with respect to a positioning of the interposing member and the fence.

In certain embodiments, the biasing member may be provided with an arm portion that is slidably in contact with a biasing member receiving portion provided in the other one of the interposing member and the base.

In the above aspect, the arm portion of the biasing member can be elastically pressed against the biasing receiving portion. Thus, regarding the biasing member, a biasing force in a direction in which the engaging member is entered into the transverse groove hole may be produced.

In certain embodiments, the second fixing member may be provided with a cam lever that can fix the fence to the interposing member by rotational operation of a cam action.

In the above aspect, instead of the second fixing member, rotational operation of the cam action of the operating lever may fix the fence to the interposing member.

DETAILED DESCRIPTION OF THE INVENTION

Each of the additional features and teachings disclosed above and below may be utilized separately or in conjunction with other features and teachings to provide an improved cutting device. Representative examples of the present teaching, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings.

Figure 1:
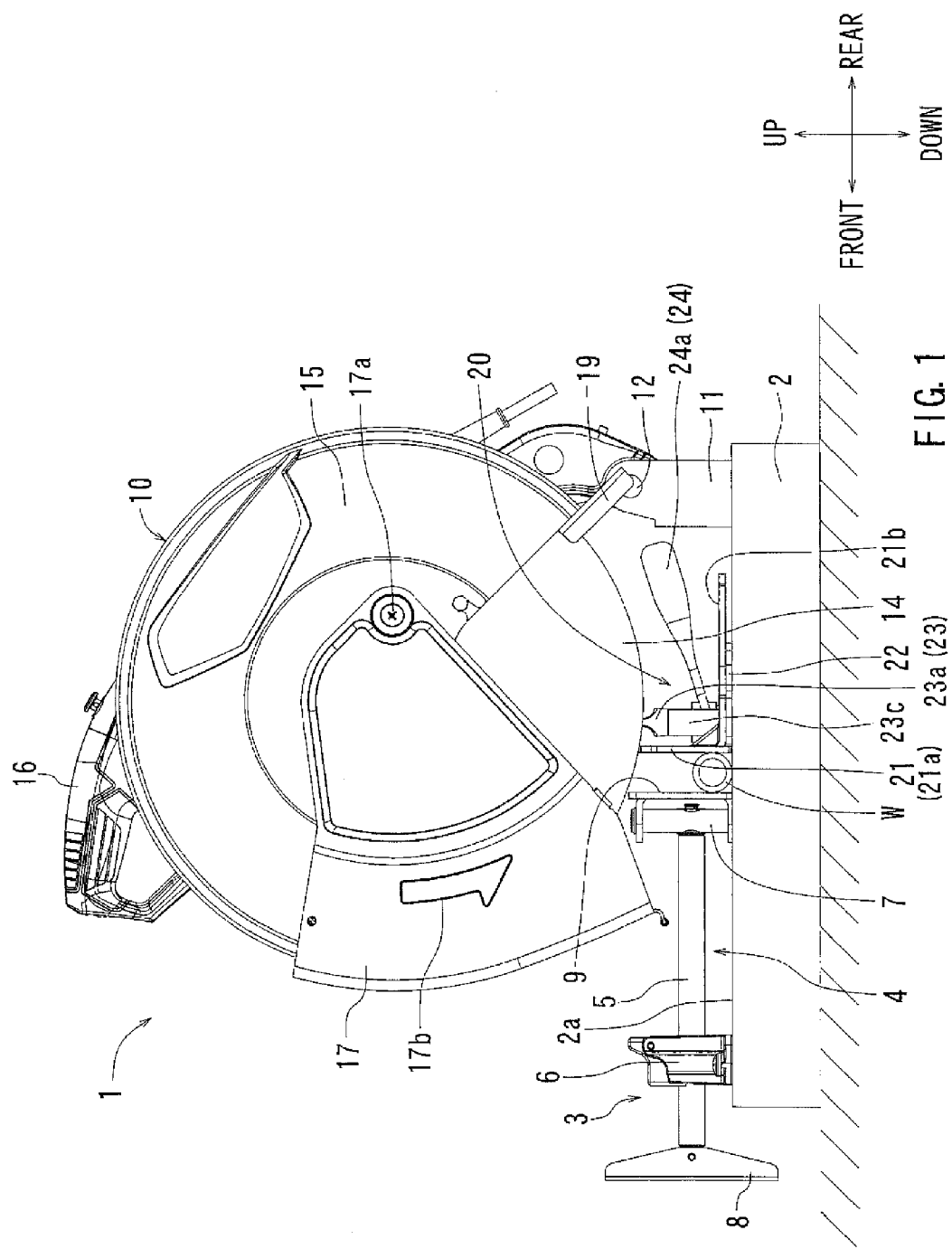
FIG. 1 is a right side view of a cutting device according to an embodiment of the present invention.
Figure 2:
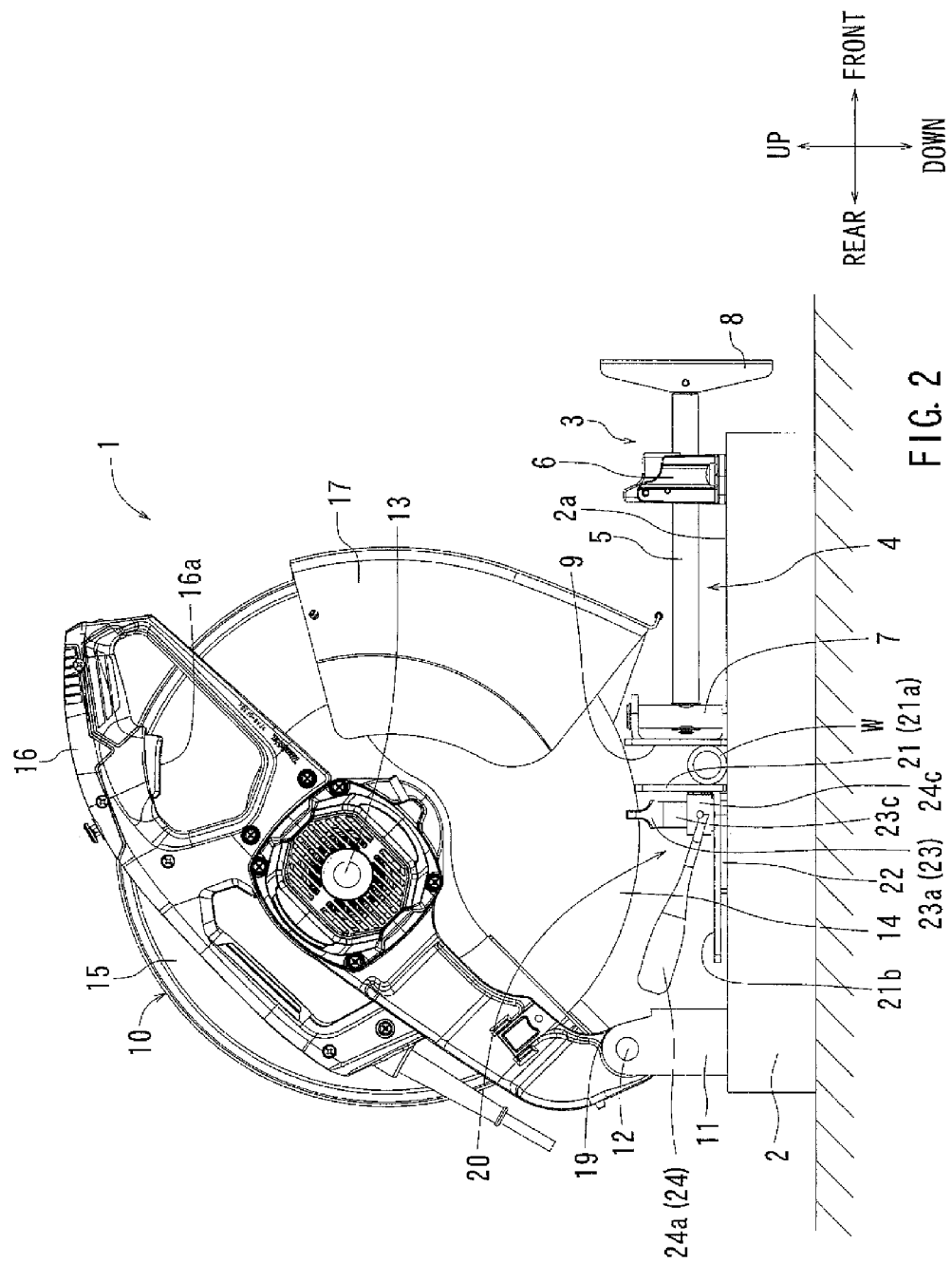
FIG. 2 is a left side view of a cutting device according to an embodiment of the present invention.
Figure 3:
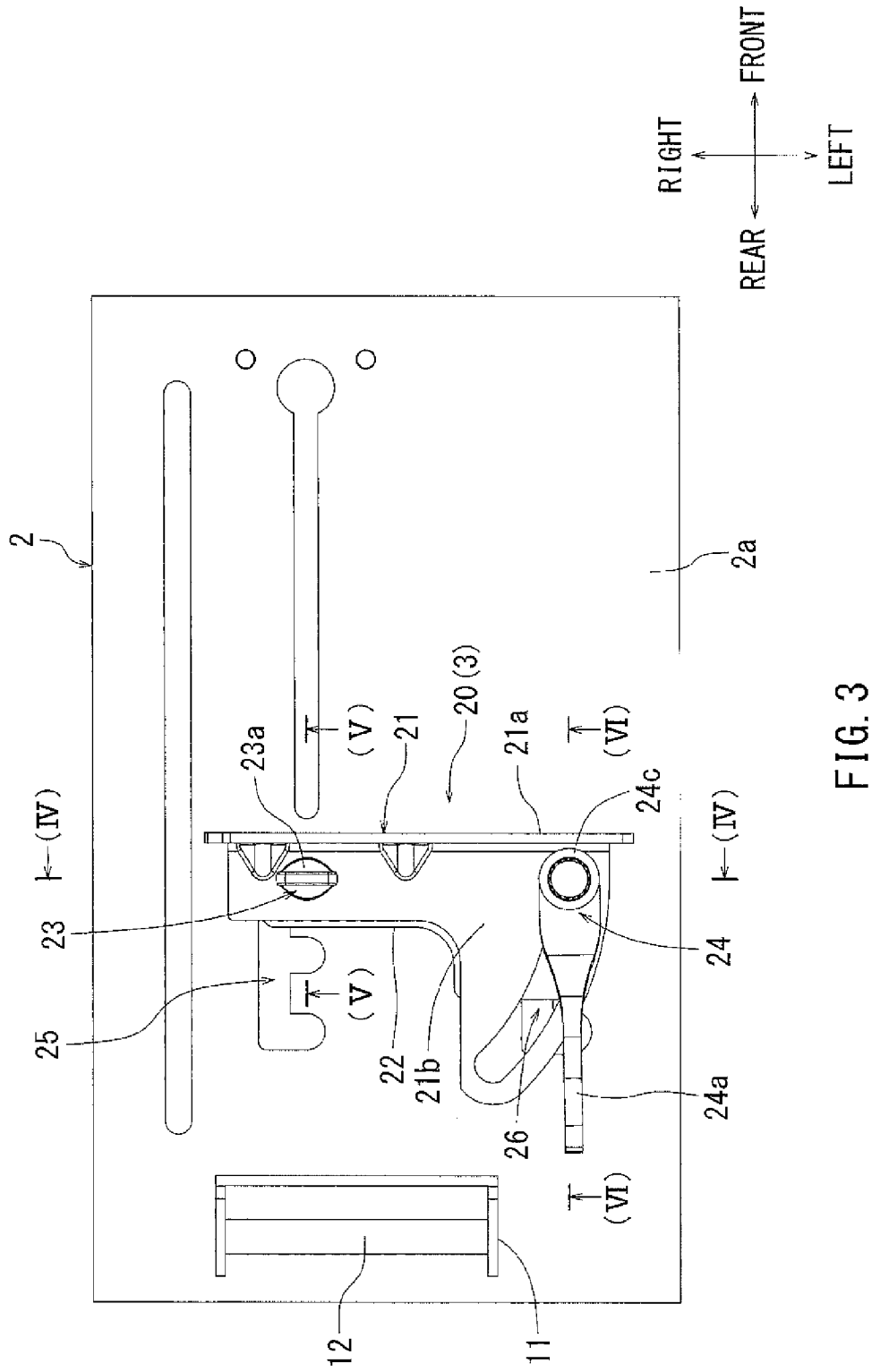
FIG. 3 is a plane view of a base.

A cutting device according to an embodiment of the present invention will be described below with references to FIGS. 1 to 11. FIG. 1 shows a cutting device 1 according to the embodiment. The cutting device 1 is for metal machining and it cuts a material W to be cut such as a metal pipe etc. The cutting device 1 has a base 2 on which the material W to be cut is placed and a tool main body 10 that is supported by the base 2. In FIG. 1, a user operates the cutting device 1 while the user is situated on the left side of the cutting device 1. In an explanation below, a front side viewed from the user is configured to be a front side (left side in FIG. 1), and a side away from the user is configured to be a rear side (right side in FIG. 1). Further, as shown in FIG. 3, a right side and a left side are decided based on where the user is situated.

The base 2 is a press-formed product of a steel plate. Compared to a base made of aluminum die cast, the base 2 is manufactured at a very low cost. A top plate part 2a of the base 2 is reinforced by a reinforcing member 2b that is attached to a lower surface of the base 2, whereby sufficient rigidity is ensured. The reinforcing member 2b is fixed to the lower surface of the base 2 by welding. On the top plate part 2a of the base 2, there is provided a vise device 3. The vise device 3 fixes a material W to be cut to the top plate part 2a of the base 2. The cutting device 1 according to the embodiment is characterized by a fence 20 that is a component of the vise device 3. Configurations other than the fence 20 such as a tool main body 10 etc., are not specifically modified from prior art. Thus, only brief explanations will be made about those known components.

The tool main body 10 is supported by the base 20 via a main body supporting part 11 that is mounted in the vicinity of a rear end of the top plate part 2a of the base 2. In more detail, the tool main body 10 is supported by the base 20 via a tilting shaft 12 that is provided in the main body supporting part 11 such that the tool main body 10 can be vertically tilted. The tool main body 10 is biased upwards (the side of a top dead center) such that it can be vertically tilted by means of a compression spring (not shown) that is inserted between the top plate part 2a of the base 2 and the top main body 10.

The tool main body 10 has a circular cutting blade 14 that is rotated by an electric motor 13 serving as a driving source. Approximately one half of the circumference of the upper side of the cutting blade 14 is covered by a main body case 15. The electric motor 13 is attached to the left side of the main body case 15 via a reduction gear part. A loop-shaped handle 16 that is held by a user is provided above the reduction gear part on the left side of the main body case 15. When the user pulls a switch lever 16a that is provided in the handle 16 by a finger, the electric motor 13 starts and the cutting blade 14 rotates rapidly in a predetermined direction. Approximately one half of the circumference of the lower side of the cutting blade 14 protrudes downward from the main body case 15. A front side of the protruding portion is covered by a movable cover 17. The movable cover 17 is rotatably supported by the main body case 15 via a supporting shaft 17a. As shown in FIG. 1, an arrow showing a rotation direction of the cutting blade 14 is labeled on the right side surface of the movable cover 17. Further, in a rear part of the main body case 15, there is provided a shielding plate 19 for preventing cutting powder produced at the cutting position from scattering rearward.

The vise device 3 according to the embodiment is generally termed a quick vise, which has a vise main body 4 and a fence 20 for holding the material W to be cut from both the front side and the rear side to fix to the base 2.

The vise main body 4 has a vise plate 9 for holding the material W to be cut. The vise plate 9 is supported by a tip end of a screw shaft 5 via a supporting shaft 7 that can be swung in the right and left directions. The screw shaft 5 is supported by a vise base 6 that is fixed to the upper surface of the top plate part 2a of the base 2, in such a way that it can be changed between a screw engagement state and a screw disengagement state. In a front end of the screw shaft 5, there is provided a handle 8 that a user holds when rotating the screw shaft 5.

By rotating the screw shaft 5 in the screw engagement state, the vise plate 9 can be moved to or away from a fence plate 21. By rotating the screw shaft 5 in a fastening direction and moving the vise plate 9 to the fence plate 21, the material W to be cut is firmly held between the vise plate 9 and the fence plate 21. Thus, the material W is fixed with respect to the base 2. When the vise plate 9 is changed to the screw disengagement state, the vise plate 9 can be moved to or away from the fence plate 21 along an axis line without rotating the screw shaft 5. In this way, the material W to be cut can be rapidly held between the plates 9 and 21, and also can be rapidly release the holding state.

Figure 7:
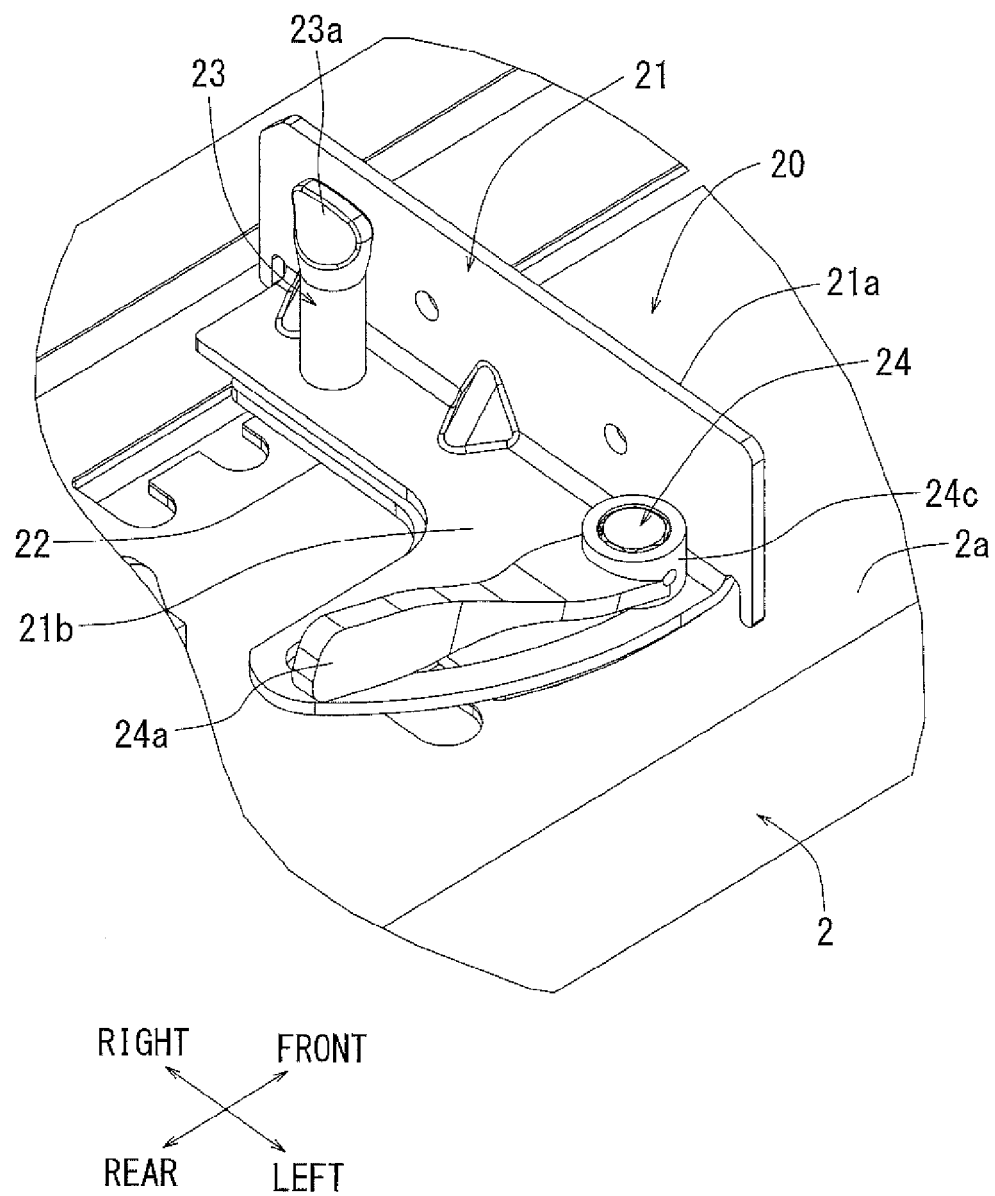
FIG. 7 is a perspective view of a fence viewed from an upper rear side.

The fence 20 is configured to be fixed to the top plate part 2a of the base 2. The fence 20 according to the embodiment has the fence plate 21, an interposing member 22, a first fixing member 23, and a second fixing member 24. The fence plate 21 has a contact part 21a that is perpendicular to the top plate part 2a of the base 2, and also has a base part 21b that is situated along the top plate part 2a of the base 2. As shown in FIG. 7, the base part 21b has an L-shape viewed from above. The material W to be cut is brought into contact with a front surface (a fence surface) of the contact part 21a.

Figure 8:
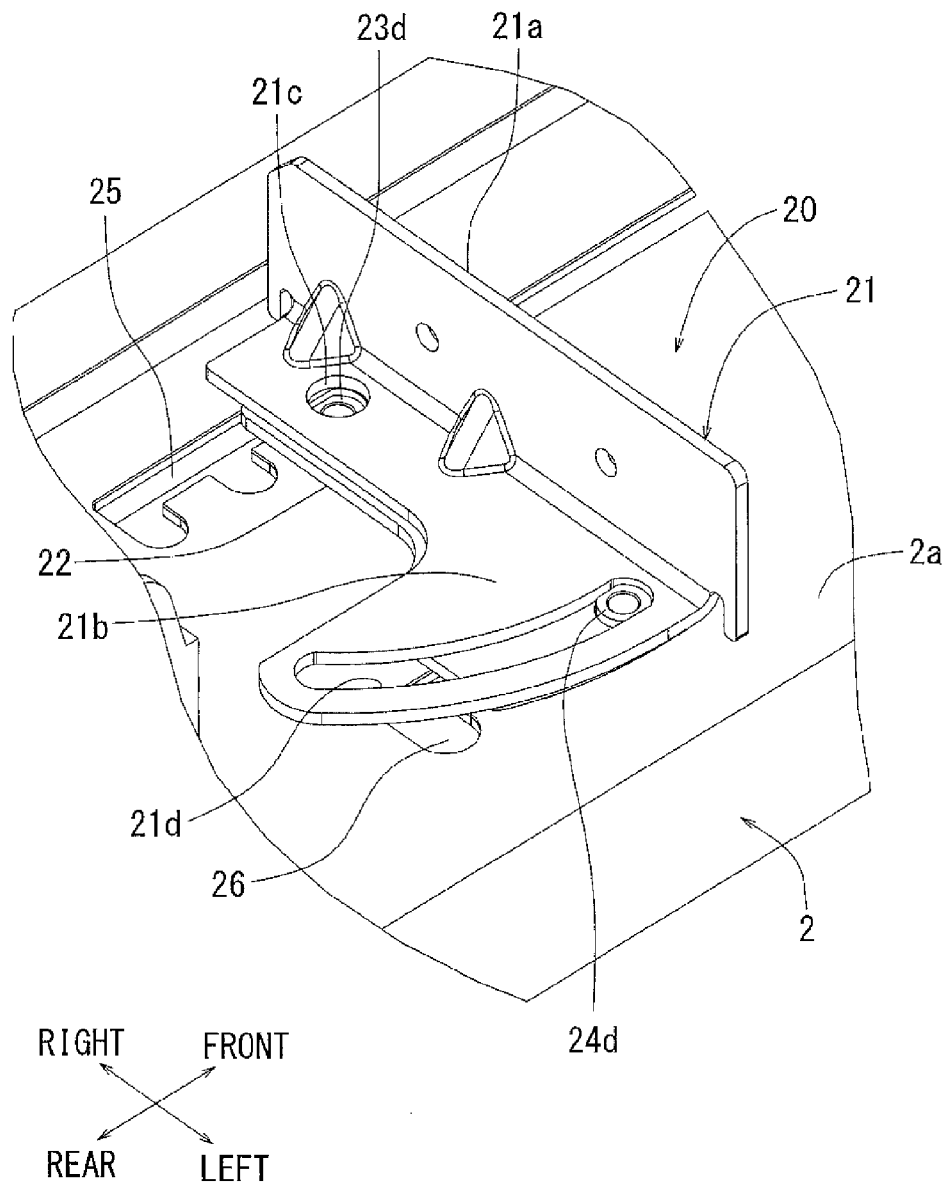
FIG. 8 is a perspective view of a fence viewed from an upper rear side in which the first and second fixing members are removed from the fence.
Figure 9:
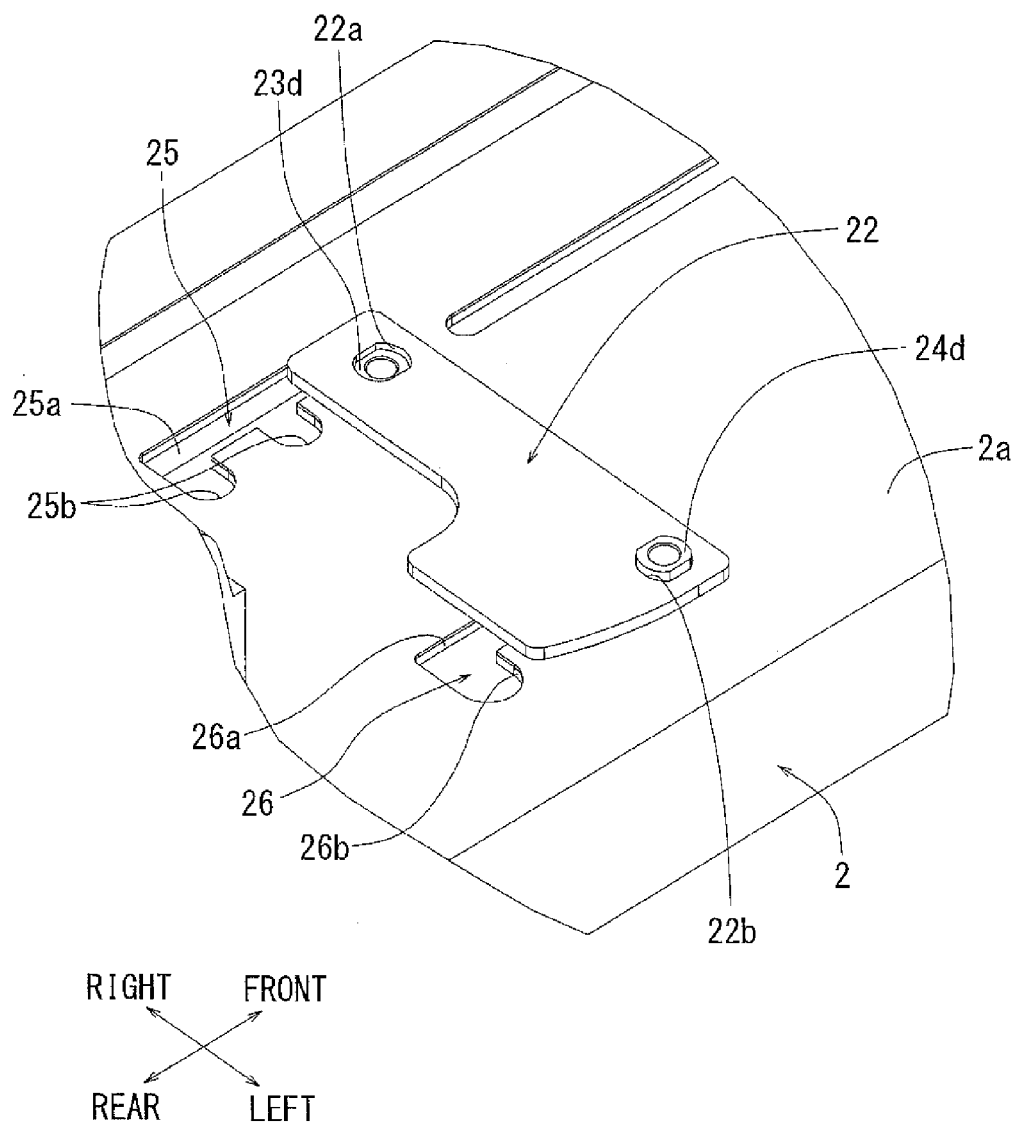
FIG. 9 is a perspective view showing an interposing member and a top plate in which a fence, a first fixing plate, and a second fixing plate are removed.

The interposing member 22 is a plate having a planar shape. The interposing member 22 is interposed between a lower surface of the base part 21b of the fence plate 21 and an upper surface of the top plate part 2a of the base 2. As shown in FIGS. 7 and 8, the interposing member 22 has an area and a shape to such an extent that it does not largely protrude from the base part 21b of the fence plate 21. A steel plate is used for the interposing member 22, and both the front surface and the back surface of the steel plate are precisely machined for high flatness.

The fence plate 21 and the interposing member 22 can be moved independently along the top plate part 2a of the base 2. The interposing member 22 can be fixed with respect to the top plate part 2a of the base 2 by means of the first fixing member 23. The fence plate 21 can be fixed with respect to the interposing member 22 by means of the second fixing member 24. That is, by means of both the first fixing member 23 and the second fixing member 24, the fence plate 21 can be indirectly fixed with respect to the top plate part 2a of the base 2.

Figure 4:
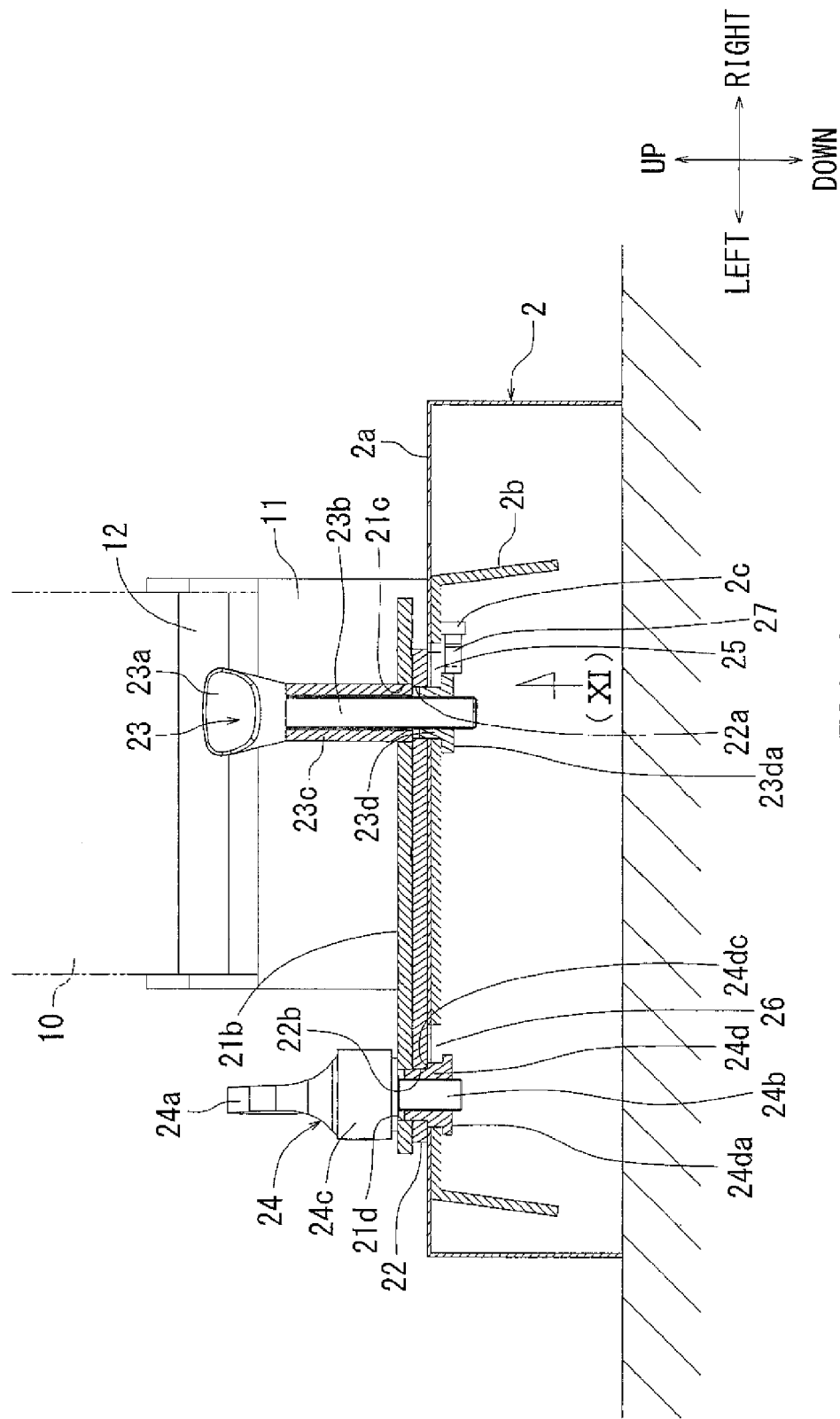
FIG. 4 is a vertical cross-sectional view of the base taken along line (IV)-(IV) of FIG. 3.
Figure 5:
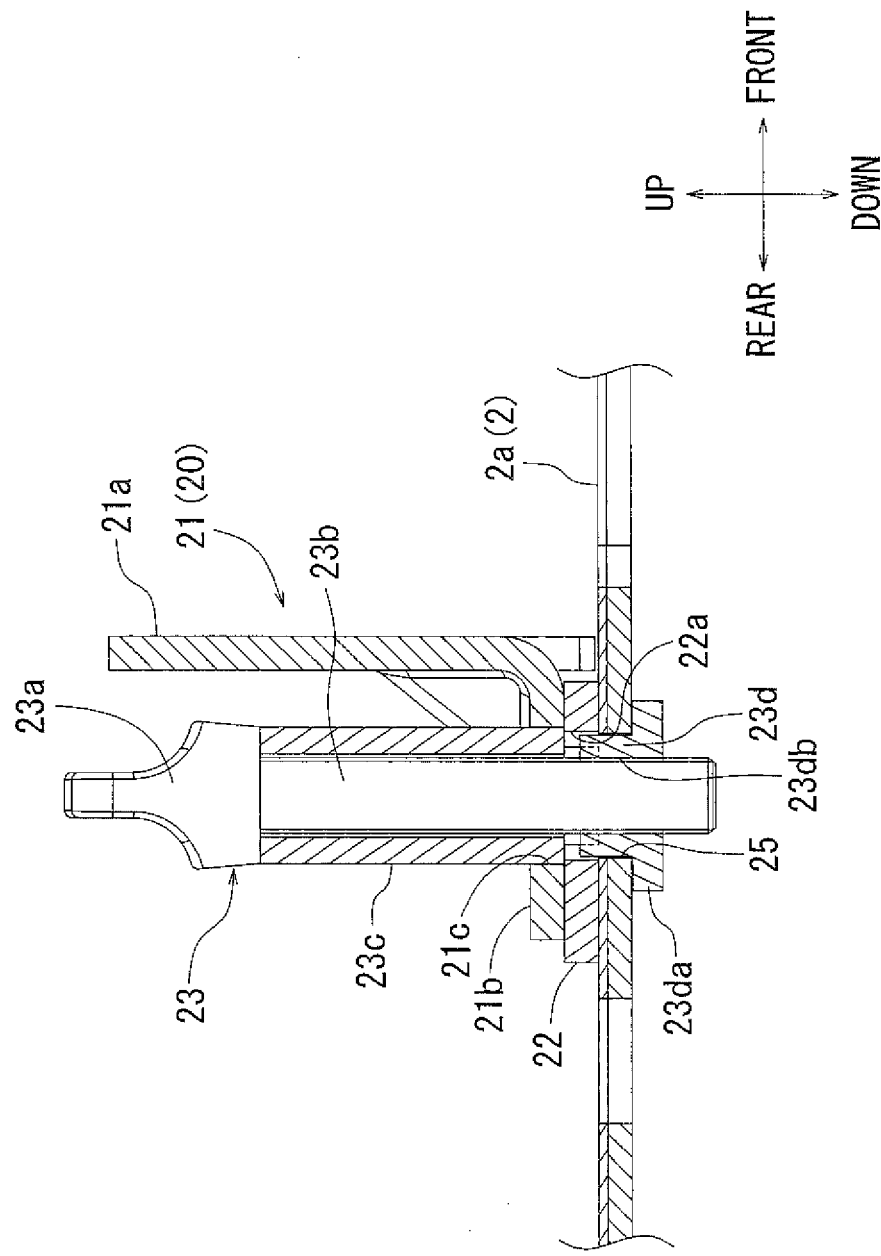
FIG. 5 is a vertical cross-sectional view of a first fixing member taken along line (V)-(V) of FIG. 3.

The first and second fixing members 23 and 24 are configured to fix the fence plate 21 and the interposing member 22 to the top plate part 2a of the base 2 through fastening screws of the first and second fixing members 23 and 24. As shown in FIGS. 4 and 5, the first fixing member 23 is provided with a screw axis 23b. On the top of the screw axis 23b, there is provided a knob 23a that a user pinches by the fingertips in order to fasten or loosen the fence plate 21. The screw axis 23b is inserted through the inner circumference of a sleeve 23c. A lower part of the sleeve 23c is inserted through a circular inserting hole 21c that is provided in the base part 21b of the fence plate 21. A lower end part of the sleeve 23c strikes against an upper surface of the interposing member 22. A lower part of the screw axis 23b protrudes from a bottom portion of the sleeve 23c. A guiding member 23d serving as a nut is fastened around the protruding portion of the screw axis 23b. The protruding portion of the screw axis 23b is fastened around a screw hole 23db provided in the center of the guiding member 23d. A flange part 23da is integrally provided in the lower part of guiding member 23d. The flange part 23da is brought into contact with a lower surface of the reinforcing member 2b. The guiding member 23d is inserted through a first engaging hole 25 provided in the reinforcing member 2b (and the top plate 2a) of the base 2 and a first inserting hole 22a provided in the interposing member 22. The first inserting hole 22a of the interposing member 22 is formed in an elliptical shape with a flat part in the width direction. The guiding member 23d having the flat part in the width direction is inserted through the first inserting hole 22a. And the guiding member 23d is prevented from rotating with respect to the interposing member 22 and eventually the top plate part 2a.

As shown in FIGS. 4 and 5, the first inserting hole 22a is formed in an elliptical shape and has a smaller hole diameter than an outer diameter of the sleeve 23c. Because of this, by pinching the knob 23a by the fingertips and fastening the screw axis 23b with respect to the guiding member 23d in a fastening direction, the lower end of the sleeve 23c strikes against the upper surface of the interposing member 22, and the flange part 23da of the guiding member 23d is pressed against the lower surface of the reinforcing member 2b. Thus, the interposing member 22 is fixed with respect to the base 2 in such a manner that the interposing member 22 is disposed overlapping the upper surface of the top plate part 2a. On the other hand, by loosening the screw axis 23b with respect to the guiding member 23d in a loosening direction, the striking condition of the sleeve 23c with respect to the interposing member 22 and the pressing condition of the flange part 23da of the guiding member 23d with respect to the reinforcing member 2b are loosened. Thus, the fixing condition of the interposing member 22 with respect to the top plate part 2a is released. Accordingly, the interposing member 22 becomes such a condition that it can be moved along the upper surface of the top plate part 2a.

Figure 6:
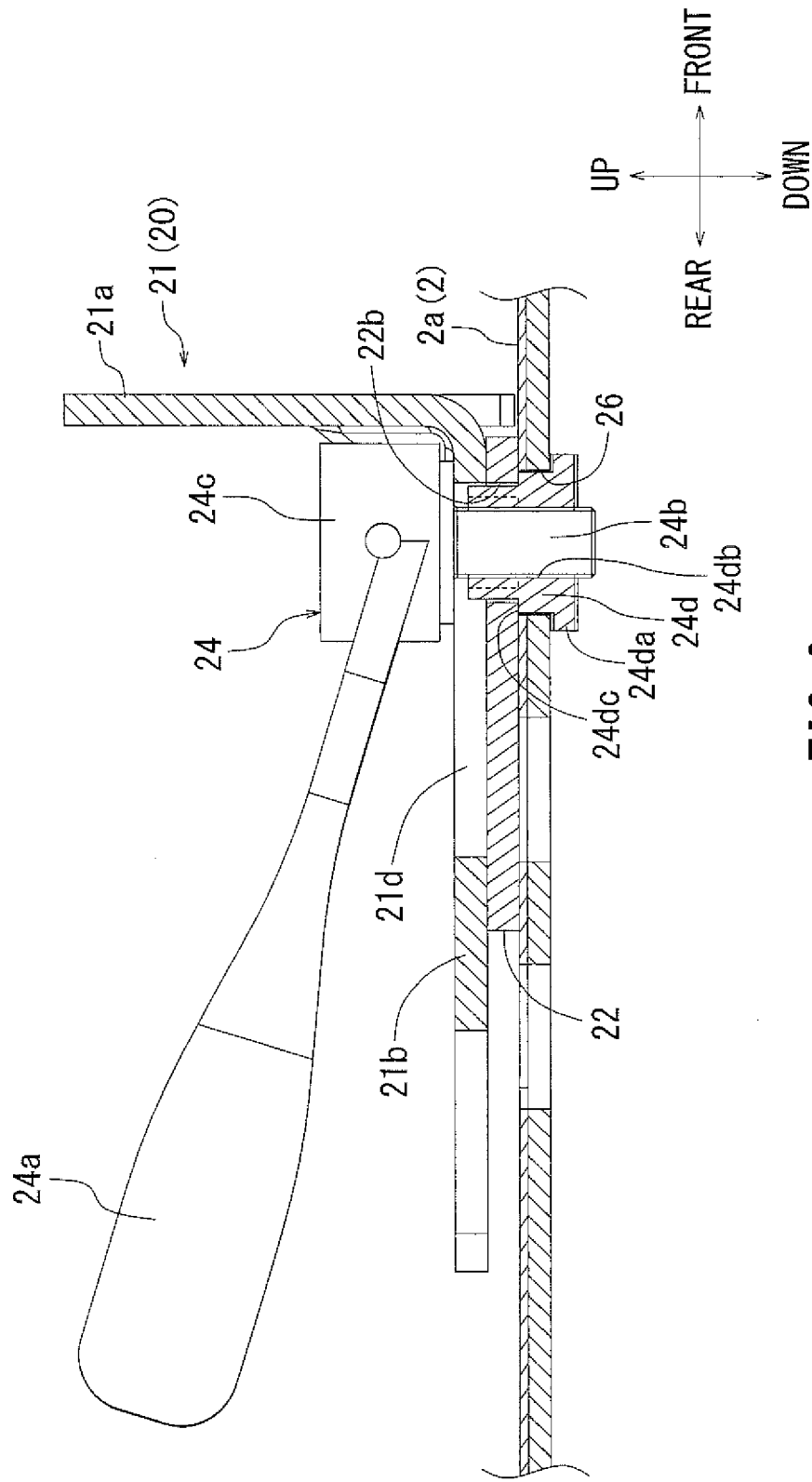
FIG. 6 is a vertical cross-sectional view of a second fixing member taken along line (VI)-(VI) of FIG. 3.

The interposing member 22 can be fixed with respect to the top plate part 2a only by the first fixing member 23. However, only by the first fixing member 23, the fence plate 21 cannot be fixed with respect to the interposing member 22 and the top plate part 2a. In order to fix the fence plate 21 with respect to the base 2, it is necessary to operate the second fixing member 24. As shown in FIGS. 4 and 6, the second fixing member 24 is provided with a screw axis 24b. On the top of the screw axis 24b, there is provided a large operating lever 24a that a user holds when he or she fastens or loosens the second fixing member 24. The operating lever 24a is integrally joined to the upper part of the screw axis 24b via a round lever base 24c that is integrally provided in a turning base end of the operating lever 24a. As shown in FIG. 6, the operating lever 24a extends obliquely rearward and upward. By holding the operating lever 24a and moving it in the right and left directions, the user can rotate the screw axis 24b by a predetermined angle.

A lower surface of the lever base 24c is brought into contact with an upper surface of the base part 21b of the fence plate 21. The screw axis 24b extends downward and protrudes from the lower surface of the top plate part 2a via an inserting groove hole 21d that is provided in the base part 21b. A guiding member 24d served as a nut is fastened around the protruding portion of the screw axis 24b. The protruding portion of the screw axis 24b is fastened around a screw hole 24db that is provided at the center of the guiding member 24d. A flange part 24da is provided in a lower part of the guiding member 24d. The flange part 24da is brought into contact with the lower surface of the reinforcing member 2b.

A step portion 24dc is provided on the outer peripheral surface of the guiding member 24d at a nearly central part in a screw axis direction. Because of this, the guiding member 24d has a tiered structure. In more detail, the upper part of the guiding member 24d in a screw axis direction has a smaller diameter than the lower part of the guiding member 24d. The lower part of the guiding member 24d in the screw axis direction (the lower part below the step portion 24dc) is inserted through a second engaging hole 26 that is provided in the reinforcing member 2b (and the top plate 2a). The step portion 24dc is pressed against the lower surface of the interposing member 22.

The upper part of the guiding member 24d in the screw axis direction (the upper part above the step portion 24dc) is inserted through a second inserting hole 22b that is provided in the interposing member 22 and the inserting groove hole 21d that is provided in the base part 21b. Similar to the guiding member 23d of the first fixing member 23, the guiding member 24 of the second fixing member 24 has a flat part in the width direction. The flat part in the width direction of the guiding member 24d is inserted through the second inserting hole 22b. The second inserting hole 22b is provided in the interposing member 22 and formed in an elliptical shape. In this way, the guiding member 24d is prevented from rotating with respect to the interposing member 22 and the top plate part 2a.

As shown in FIG. 8, the inserting groove hole 21d of the fence plate 21 is formed in a long shape along a circular arc that has its center at the inserting hole 21c.

When the operating lever 24a is rotated in a fastening direction, the guiding member 24d is fastened with respect to the screw axis 24b. When the guiding member 24d is fastened with respect to the screw axis 24b, the lever base 24c is pressed against the upper surface of the base part 21b of the fence plate 21, and the step portion 24dc of the guiding member 24d is pressed against the lower surface of the interposing member 22. Because of this, the interposing member 22 and the base part 21b of the fence plate 21 are firmly held between the lever base 24c and the step portion 24dc of the guiding member 24d. Thus, the interposing member 22 and the base part 21b of the fence plate 21 are fixed to each other. When the operating lever 24a is rotated in a loosening direction, the guiding member 24d is loosened with respect to the screw axis 24b, so that the fence plate 21 can be separately moved along the interposing member 22 and eventually along the upper surface of the top plate part 2a.

As stated above, when the first fixing member 23 and the second fixing member 24 are operated in the fastened state, a position and a direction of the fence plate 21 is fixed with respect to the upper surface of the top plate part 2a. When the first fixing member 23 is operated in the fastened state and the second fixing member 24 is operated in the loosened state, the interposing member 22 is fixed to the upper surface of the top plate part 2a while the fence plate 21 can be moved with respect to the interposing member 22. On the other hand, when the first fixing member 23 is operated in the loosened state and the second fixing member 24 is operated in the fastened state, the fence plate 21 and the interposing member 22 can be integrally moved with respect to the upper surface of the top plate part 2a. Further, when both the first fixing member 23 and the second fixing member 24 are operated in the loosened state, the fence plate 21 and the interposing member 22 can be moved separately, but at the same time, with respect to the upper surface of the top plate part 2a.

Figure 10:
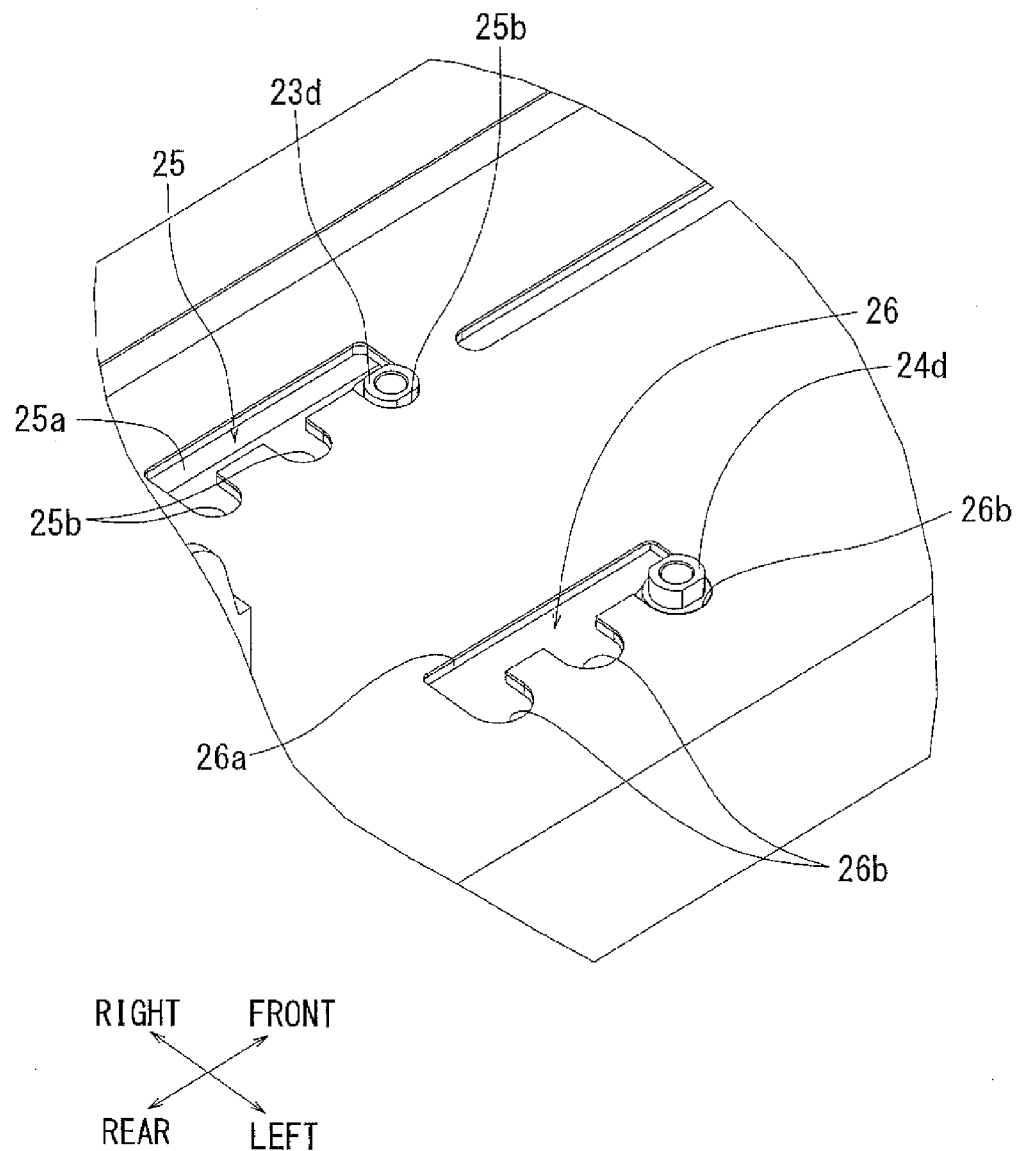
FIG. 10 is a perspective view of a top plate part in which an interposing member and a fence are removed.

As shown in FIG. 10, the first engaging hole 25 and the second engaging hole 26 in the top plate part 2a are provided corresponding to the first fixing member 23 and the second fixing member 24, respectively. The first engaging hole 25 is formed in an E-shape (a comb shape) including a longitudinal groove hole 25a and three transverse groove holes 25b. Similarly, the second engaging hole 26 is formed in an E-shape including a longitudinal groove hole 26a and three transverse groove holes 26b. The longitudinal groove hole 25a and the longitudinal groove hole 26a extend along the longitudinal direction (front-rear direction) and are provided in parallel with each other. The three transverse groove holes 25b of the first engaging hole 25 are provided in a cut shape having the same depth from the longitudinal groove hole 25a on the left side. Similarly, the three transverse groove holes 26b of the second engaging hole 26 are provided in a cut shape having the same depth from the longitudinal groove hole 26a on the left side.

The guiding member 23d of the first fixing member 23 is inserted through the first engaging hole 25. Similarly, the guiding member 24d of the second fixing member 24 is inserted through the second engaging hole 26. The guiding member 23d of the first fixing member 23 can be moved in the longitudinal direction within the longitudinal groove hole 25a of the first engaging hole 25, and can be inserted into any one of the transverse groove holes 25b. Similarly, the guiding member 24d of the second fixing member 24 can be moved in the longitudinal direction within the longitudinal groove hole 26a of the second engaging hole 26, and can be inserted into any one of the transverse groove holes 26b.

Because of this, when the first fixing member 23 is loosened, the interposing member 22 can be moved with respect to the top plate part 2a within a movable range of the guiding member 23d in the first engaging hole 25, and within a movable range of the guiding member 24d of the second fixing member 24 in the second engaging hole 26. By moving the interposing member 22 along the top plate part 2a, a position of the contact part 21a of the fence plate 21 can be changed.

Figure 11:
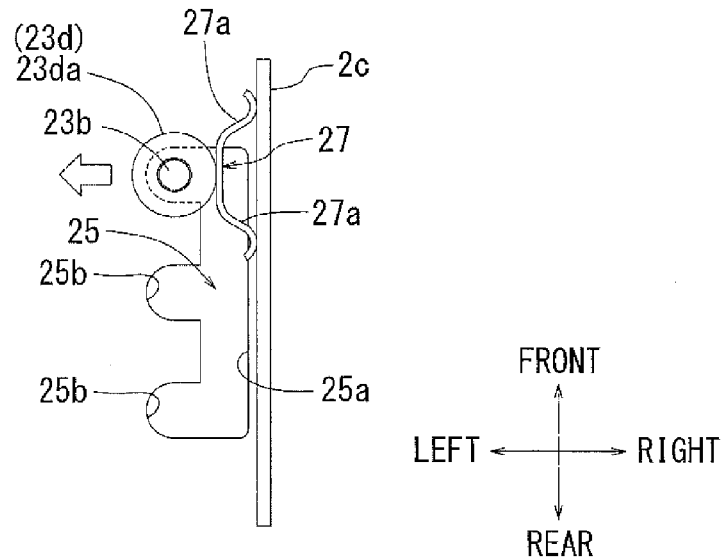
FIG. 11 is a bottom view showing a first fixing member viewed in the (XI) direction of FIG. 4, i.e. viewed from a bottom side of the top plate.

As shown in FIGS. 4 and 11, a biasing member 27 is disposed on the flange part 23da of the guiding member 23d. In the embodiment, a leaf spring may be used as the biasing member 28. The biasing member 28 has arm portions 27a projecting in the front and rear directions. In opposition to the biasing member 27, a biasing member receiving portion 2c is provided in the lower surface of the top plate part 2a. The biasing member receiving portion 2c is provided along the longitudinal groove hole 25a of the first engaging hole 25 such that the portion 2c projects in the downward direction. By the arm portions 27a of the biasing member 27 being pressed against the biasing member receiving portion 2c, the guiding member 23d is biased in a direction in which the guiding member 23d enters into the transverse groove hole 25b from the longitudinal groove hole 25a of the first engaging hole 25. Because of this, when the user changes the positions of the fence plate 21 and the interposing member 22 by loosening the first fixing member 23, the user initially moves the fence plate 21 and the interposing member 22 against the biasing member 27 to the right side. Then, the user moves the guiding member 23d of the first fixing member 23 and the guiding member 24d of the second fixing member 24 into the longitudinal groove hole 25a of the first engaging hole 25 and the longitudinal groove hole 26a of the second engaging hole 26, respectively. In this state, the fence plate 21 and the interposing member 22 can be moved in the front and rear directions.

When the moving operation of the fence plate 21 and the interposing member 22 to the right side is released, the guiding member 23d of the first fixing member 23 and the guiding member 24d of the second fixing member 24 enter into the transverse groove holes 25b and 26b from the longitudinal groove holes 25a and 26a by a biasing force of the biasing member 27. Thus, the fence plate 21 and the interposing member 22 are moved to the left side. At this point, the guiding members 23d and 24d of the first and second fixing members 23 and 24 enter into the transverse groove hole 25b and 26b, respectively. Thus, the fence plate 21 and the interposing member 22 are positioned in the front and rear directions. In other words, the guiding members 23d and 24d of the first and second fixing members 23 and 24 serve as engaging parts that are in a convex-concave engagement with the transverse groove holes 25b and 26b of the first and second engaging holes 25 and 26. Accordingly, by use of the first and second fixing members 23 and 24, the fence plate 21 and the interposing member 22 cannot only be positioned in the front and rear directions but also repeatedly positioned with high reproducibility to any position selected from a plurality of predetermined positions (termed a positive stop structure).

After the guiding members 23d and 24d of the first fixing members 23 and 24 enter into the transverse groove holes 25b and 26b of the first and second engaging holes 25 and 26, and the fence plate 21 and the interposing member 22 are positioned, the knob 23a of the first fixing member 23 is held and the screw axis 23b is rotated in the fastening direction. Then, the interposing member 22 is fixed to the top plate part 2a. In this way, a position of the fence plate 21 is determined in the front and rear directions.

As described above, the interposing member 22 can be moved in the front and rear directions, and a position of the fence plate 21 can be changed at three positions in the front and rear directions. Further, a direction of the fence plate 21 can be changed. In order to change a direction of the fence plate 21, the second fixing member 24 must be loosened by rotating the operating lever 24 while the interposing member 22 is fixed to the top plate part 2a by fastening the operating lever 24a. When the second fixing member 24 is loosened with the first fixing member 23 being in a fixed state, the fence plate 21 can be moved with respect to the interposing member 22. In this case, the fence plate 21 can be rotated around the first fixing member 23 in the front and rear directions. Thus, a direction of the fence plate 21 can be changed.

In the fastening state of the first fixing member 23, the sleeve 23c is merely inserted into the inserting hole 21c provided in the base part 21b of the fence plate 21. Accordingly, even when the first fixing member 23 is in the fastening state, the fence plate 21 can be rotated around an axis line of the screw axis 23b in the front and rear directions. Thus, a direction of the contact part 21a can be changed. In this situation, the interposing member 22 is fixed with respect to the top plate part 2a by the first fixing member 23, and thus a position of the guiding member 24d of the second fixing member 24 remains relatively fixed with respect to the engaging hole 26.

A direction of the fence plate 21 can be changed within a range where the guiding member 24d of the second fixing member 24 can be relatively moved within the circular arc-shaped inserting groove hole 21d.

After a direction of the fence plate is changed, the operating lever 24a is rotated in the fastening direction to fasten the second fixing member 24. Then, the fence plate 21 is fixed to the interposing member 22. In this way, the fence plate 21 is fixed to the top plate part 2a.

For the interposing member 22, a steel plate is used, and both the front surface and the back surface of the steel plate are precisely machined for high flatness to such an extent that there is little or no undulation, no warpage nor deflection. Because of this, a rotation amount (a rotation angle) of the operating lever 24a in the fastening or loosening direction when changing a direction of the fence plate 21 can be constant regardless of a direction of the fence plate 21. Thus, the second fixing member 24 can be appropriately fastened without special awareness of the rotational amount.

According to the fence 20 configured as described above, when the first fixing member 23 is loosened while the second fixing member 24 is fastened, the fence plate 21 and the interposing member 24 can be moved together in the front and rear directions. Thus, a position of the contact part 21a can be changed in the front and rear directions.

On the other hand, when the second fixing member 24 is loosened while the first fixing member 23 is fastened, the fence plate 21 can be rotated around the axis line of the screw axis 23b in the front and rear directions. Thus, a direction of the contact part 21a can be changed.

When changing a direction of the fence plate 21 by loosening the second fixing member 24, the first fixing member 23 can be in a fixed state and accordingly the interposing member 22 can be fixed with regard to the top plate part 2a. Because of this, when changing a direction of the contact part 21 by rotating the fence plate 21 around the axis line of the first fixing member 23, the base part 21b is slidably in contact with the interposing member 22 that is fixed to the top plate part 2a.

The interposing member 22 is flat shaped and both the front surface and the back surface of the interposing member 22 are precisely machined for high flatness to such an extent that there is little or no undulation, no warpage nor deflection. Because of this, a rotation amount (a rotation angle) of the operating lever 24a in the fastening or loosening direction when changing a direction of the fence plate 21 can be constant regardless of a direction of the fence plate 21. In this respect, the operability and workability of the fence 20 and eventually of the vise device 3 can be improved.

The top plate part 2a and the reinforcing member 2b are configured to be connected to each other by welding in order to obtain rigidity. Accordingly, warpage or deflection may occur by welding strains etc. Because of this, in a conventional configuration in which the fence plate is fixed to the top plate part with screws, when a position or a direction of the fence plate is changed and the fence plate is fixed by fastening the screw, a fastening amount necessary to fix the fence plate may vary according to the position to be fixed. In this respect, the operability and workability of the fence and eventually of the vise devise may be worsened. On the other hand, the fence 20 in the above-described embodiment is configured such that a direction of the fence plate 21 is changed on the interposing member 22 that has no undulation, warpage nor deflection. Thus, variation of an operating angle of the operating lever 24a of the second fixing member 24 can be reduced or eliminated.

Further, the fence 20 in the above-described embodiment is configured such that a position of the fence plate 21 is fixed by inserting the guiding member 23d and 24d of the first and second fixing members 23 and 24 into the transverse groove holes 25a and 26b of the first and second engaging holes 25 and 26. That is, a position of the fence plate 21 can be changed in the front and rear direction at three positions. Because of this, rapid positioning of the fence plate 21 can be obtained with high repeatability. In this respect, operability of the vise device 2 can be improved.

Further, the fence plate 21 is fixed in a state where the guiding members 23*d* and 24*d* of the first and second fixing members 23 and 24 are inserted into the transverse holes 25*d* and 26*d* of the first and second engaging holes 25 and 26. Because of this, a position of the fence plate 21 can be firmly fixed against a pressing force of the vise main body 4 applied to the fence plate 21 or a processing force of the cutting blade 14 applied via the cutting material W to be cut.

Further, the fence plate 21 and the interposing member 22 are configured to be moved in the front and rear directions by loosening the first fixing member 23 and inserting the guiding member 23*d* of the first fixing member 23 into the longitudinal hole 25*a* of the first engaging hole 25. Because of this, a position of the fence plate 21 can be changed without removing the first fixing member 23 from the first engaging hole 25. In this respect, operability of the vise device 3 can be improved.

The present invention is not limited to the above-described embodiments and can be modified without departing from the scope of the present invention. In some of the above embodiments, the interposing member 22 can be moved with respect to the top plate part 2*a* of the base 2 in the front and rear directions and the fence plate 21 can be moved in the front and rear directions. However, the interposing member 22 may be configured to be fixed to the top plate part 2*a*. That is, the second fixing member 24, which is a lever-type member, may be used to change a direction of the fence plate 21 by use of the interposing member 22. Thus, variation of an operating angle of the operating lever 24 of the second fixing member 24 can be reduced or eliminated.

Further, in some of the present embodiments, a leaf spring is used as the biasing member 27. However, instead of the leaf spring, other types of biasing members such as a compressed spring etc. may be used. Further, it is also possible to not use the biasing member 24.

Further, in some of the present embodiments, three transverse groove holes 25*b* and three transverse groove holes 26*b* are provided in the first engaging hole 25 and the second engaging hole 26, respectively. However, the number of the transverse groove holes may be one, two, or more than three. Further, it is also possible not to provide the transverse groove hole.

Figure 12:
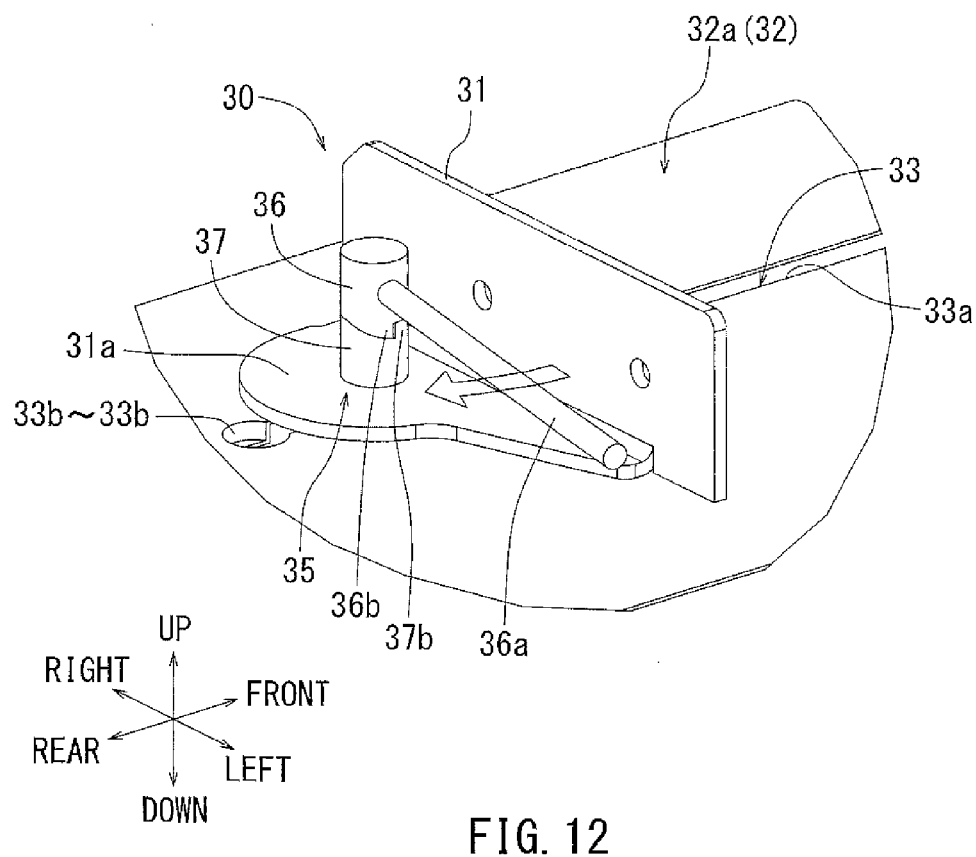
FIG. 12 is perspective view showing a cam type fixing member (a third fixing member) according to a related embodiment.

Next, FIG. 12 shows a related invention with regard to a fixing member for fixing a position of the fence plate. In more detail, it relates to a method for reducing or eliminating variation of an operating angle of the operating lever.

In some of the present embodiments, the second fixing member 24 for fixing the fence plate 21 with regard to the interposing member 22 and eventually the top plate part 2*a* of the base 2 is configured to use the screw axis 24*b* and the guiding member 24*d* that is screwed into the screw axis 24*b*. However, instead of the second fixing member 24, which is a screw-type member, a cam-type fixing member may be used to fix the fence plate 21 with regard to the top plate part 2*a*. In the following, a third fixing member 35 that is a cam-type member will be described.

FIG. 12 shows a fence 30 in which without using the interposing member 22 described above, a base part 31*a* of a fence plate 31 is directly brought into contact with the top plate part 2*a* of the base 2 by the cam-type third fixing member 35. The cam-type third fixing member 35 can reduce variation in the operating angle and thus operability of the vise device 3 can be improved.

The cam-type third fixing member 35 is provided with an upper engaging part 36 that has an operating lever 36*a* and a lower engaging part 37 that is a cylindrical part. The operating lever 36*a* extends laterally from a lateral part of the upper engaging part 36 that has a columnar shape. On a lower surface of the upper engaging part 36, there is provided an upper cam part 36*b* whose height varies in the circumferential direction. An engaging axis part 36*c* is integrally provided extending from a central part of the lower surface of the upper engaging part 36 in the lower direction.

Figure 14:
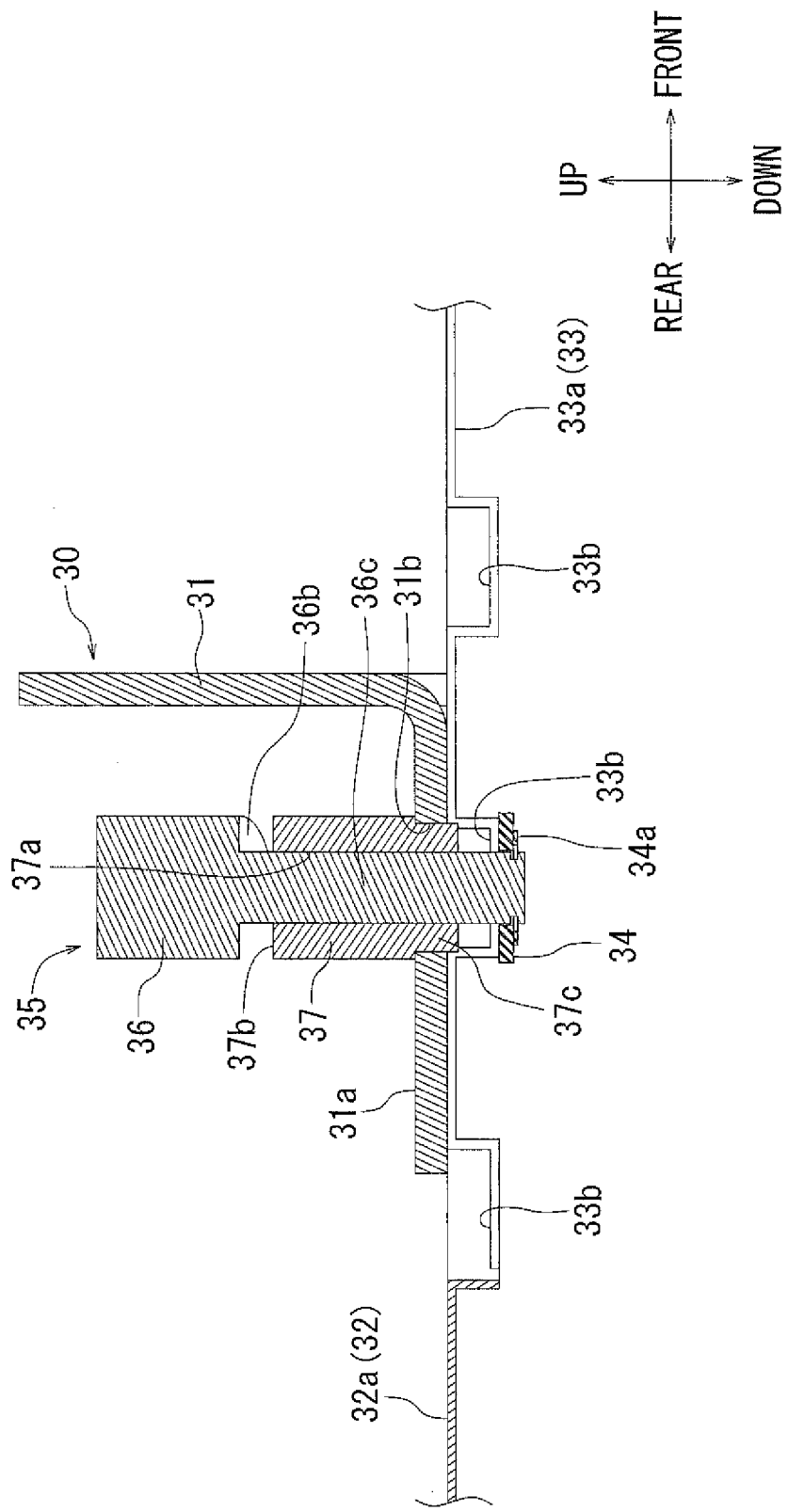
FIG. 14 is a vertical cross-sectional view of the third fixing member in a locked state.
Figure 15:
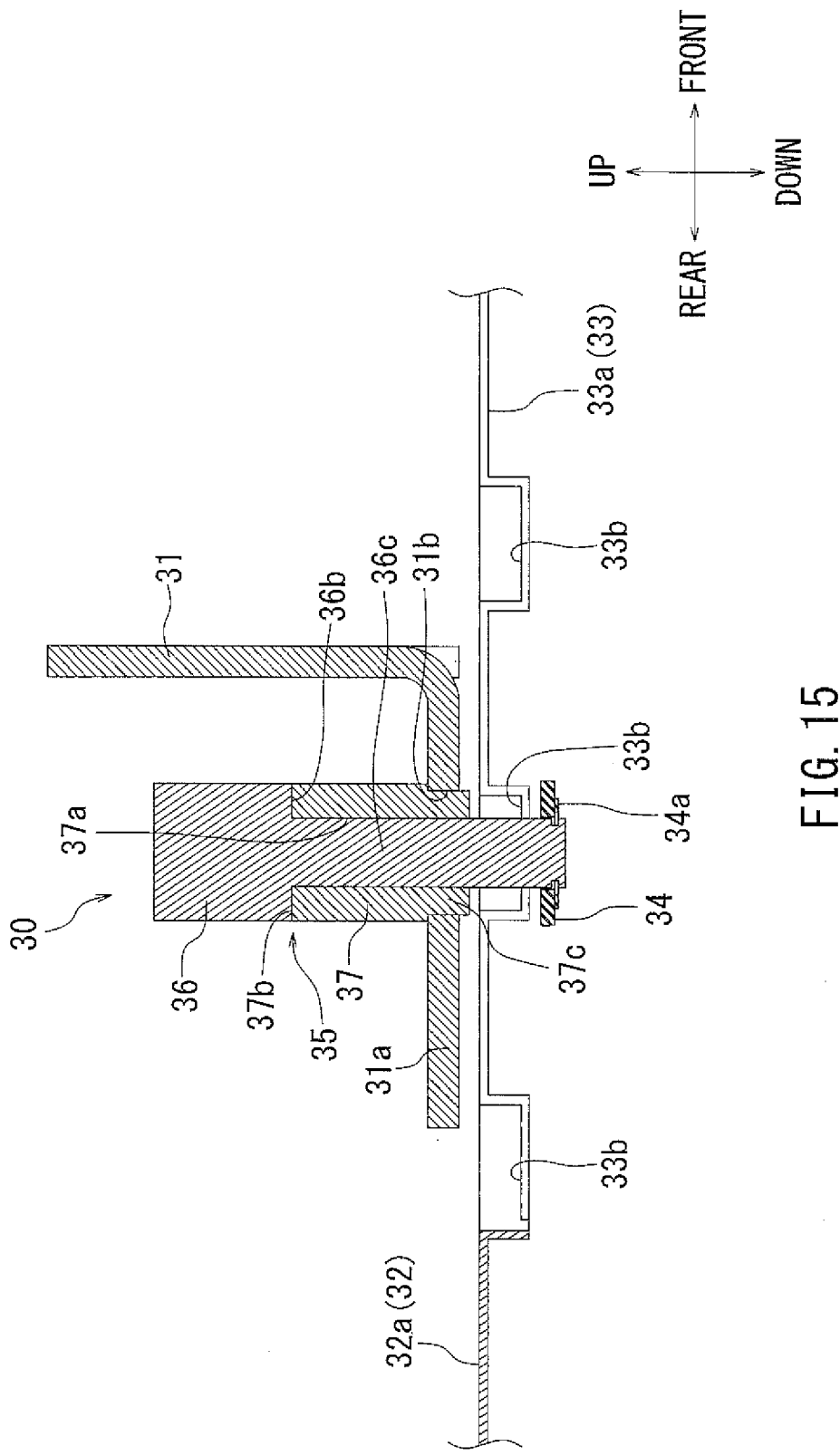
FIG. 15 is a vertical cross-sectional view of the third fixing member in a unlocked state.

As shown in FIGS. 14 and 15, the lower engaging part 37 has a cylindrical shape. The engaging axis part 36*c* of the upper engaging part 36 is inserted into an inner circumferential hole 36*c* of the lower engaging part 37 in the axial direction such that it can be relatively displaced. The upper engaging part 36 is rotatably supported with respect to the lower engaging part 37 via the engaging axis part 36*c*.

On an upper surface of the lower engaging part 37, there is provided a lower cam part 37*b* whose height varies in the circumferential direction. The upper engaging part 36 rotates with respect to the lower engaging part 37 in a state where the lower cam part 37*b* is engaged with the upper cam part 36*b*. Thus, the upper engaging part 36 moves in the upper and lower direction as the upper cam part 36*b* moves in a rotational direction with respect to the lower cam part 37*b*.

The lower engaging part 37 is attached to the fence plate 31 in a state where a small diameter part of a lower part of the lower engaging part 37 is inserted into a circular engaging hole 31*b* that is provided in the base part 31*a* of the fence plate 31. Owing to this, the lower engaging part 37 is attached to the base part 31*b* but cannot be rotated or displaced. A lower part of the small diameter part 37*c* protrudes slightly downward from a lower surface of the base part 31*a*. The fence plate 31 can be positioned by engaging the slightly protruding portion with a concave part 33*h* of the third engaging hole 33.

A lower part of the engaging axis part 36*c* protrudes downward from the lower part of the lower engaging part 37. The protruding part further protrudes downward from the top plate part 32*a* via the third engaging hole 33 that is provided in the top plate part 32*a* of the base 32. An engaging flange member 34 is axially attached to the protruding part by use of a retaining ring 34*a* and cannot be displaced.

Figure 13:
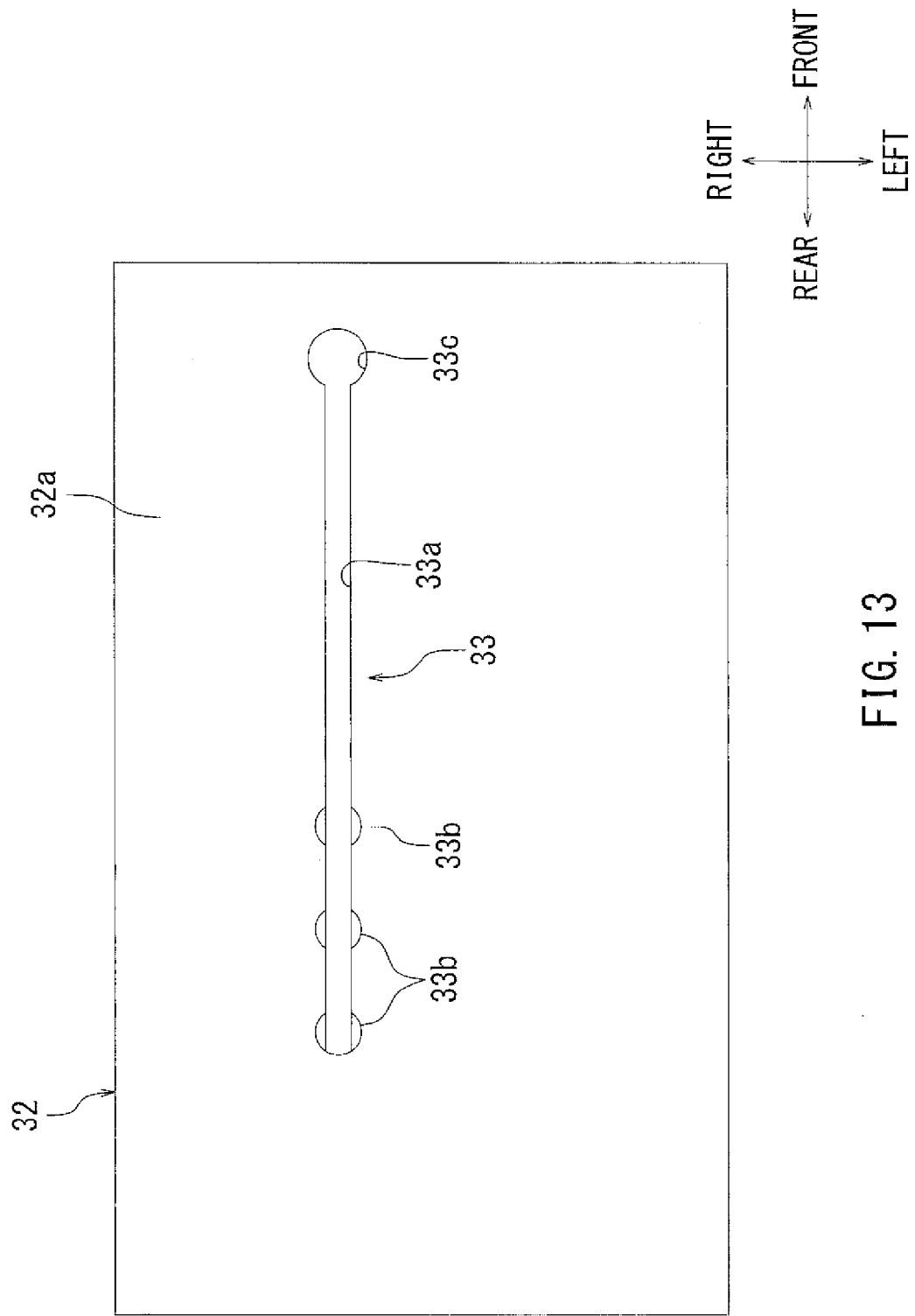
FIG. 13 is a plane view of a top plate part of the base for the third fixing member. The base has a third engaging hole.

As shown in FIG. 13, the third engaging hole 33 is formed lengthwise in the top plate part 32*a* of the base 32 along the front and rear directions. The third engaging hole 33 is provided with a longitudinal groove hole 33*a* that is lengthwise in the front and rear directions. The longitudinal groove hole 33*a* penetrates through the top plate part 32*a* along the entire length thereof. Three circular concave parts 33*b* are provided in approximately the back half of the longitudinal groove hole 33*a*. As shown in FIGS. 14 and 15, each concave part 33*b* is formed in a bottomed shape by press-working the top plate part 32*a*. In a front end of the longitudinal groove hole 33*a*, there is provided a removing hole 33*c* for removing the engaging flange member 34 from the longitudinal groove hole 33*a*. The removing hole 33*c* has a diameter that allows the engaging flange member 34 to pass through the removing hole 33*c*. The fence 30 can be removed from the top plate part 32*a* by extracting the engaging axis part 36*c* and the engaging flange member 34 from the third engaging hole 33 via the removing hole 33*c*.

When the operating lever 36*a* is rotated by a predetermined angle toward a lock side, which is shown by a void arrow mark in FIG. 12, that is, a clockwise direction, an engaging state of the upper cam part 36*b* with the lower cam part 37*b* is released and the upper engaging part 36 moves upward as shown in FIG. 14. When the upper engaging part 36 moves upward, the engaging axis part 36*c* moves upward together with the upper engaging part 36 and the engaging flange member 34 is pressed against the lower surface of the concave part 33*b*. Consequently, the fence plate 31 is fixed (locked) to the top plate part 32*a*.

The operating lever 36*a* can be rotated by a predetermined angle toward an unlock side, which is an opposite direction to the direction shown by the void arrow mark in FIG. 12. When this occurs, the upper cam part 36*b* becomes engaged with the lower cam part 37*b* and the upper engaging part 36 moves downward as shown in FIG. 15. When the upper engaging part 36 moves downward, the engaging axis part 36*c* moves downward together with the upper engaging part 36 and the engaging flange member 34 becomes separated from the lower surface of the concave part 33*b*. Consequently, the fence enters an unlocked state such that the fence plate 31 can be moved upward. In other words, the fence plate 31 lifts up from the top plate part 32*a*. By moving the fence plate 31 upward and extracting the lower part of the small diameter part 37*c* of the lower engaging part 37 from the concave part 33*b*, the fence plate 31 can be moved along the top plate 32*a*.

In the unlocked state, the fence plate 31 is moved in the front direction or the rear direction, and is rotated. Thus, a position or a direction of the fence plate 31 is changed. Afterwards, a position or a direction of the fence plate 31 can be fixed to the top plate part 32*a* by fitting the lower part of the small diameter part 37*c* into another concave part 33*b* (or the same concave part 33*b*) and rotating the operating lever 36*a* by a predetermined angle to the lock side.

In this way, in the cam-type third fixing member 35, the fence plate 31 can be locked or unlocked with respect to the top plate part 32*a* by rotating the operating lever 36*a* by a predetermined angle.

Further, the fence plate 31 can be locked or unlocked by engaging or disengaging the cam part 36*b* with the cam part 37*b*. Thus, by properly setting a lead of the cam parts 36*b* and 37*b* (larger than a lead of a fixing screw), a displacement amount of the upper engaging part 36 can be set large in comparison to the situation where a fixing screw is rotated by a predetermined angle to lock or unlock the fence plate. Because of this, the fence plate 31 can be firmly locked to the top plate part 32*a* against a pressing force of the vise main body and a cutting force that are applied to the fence plate 31.

Further, even when the top plate part of the base has undulation, warpage or deflection, application of the above-described cam-type fixing member 35 to the fence 20 instead of the second fixing member 24 can reduce or eliminate variation of an operating angle of the operating lever 36*a*. Thus, operability of the vise device can be improved.

We claim:

1. A cutting device for metal machining, comprising a base on which a material to be cut is placed, the base having first and second engaging holes and a front rear direction, a tool main body that is vertically movable and supported by the base, and a fence that is provided on a top plate part of the base and has a fence base part and a fence surface on a front side of the base for contacting the material to be cut and positioning the material on the top plate part, wherein:

the fence is configured to be fixed with respect to the base via an interposing member that is interposed between the base and the fence;

the interposing member is configured to be fixed with respect to the base by a first fixing member and the fence is configured to be fixed with respect to the interposing member by a second fixing member, whereby the fence is indirectly fixed with respect to the base;

a direction of the fence surface is configured to be changed by rotating the interposing member around a rotation axis that is situated on the fence base part at an opposite side to the material to be cut;

the interposing member comprises a first insert hole and a second insert hole;

the fence base part comprises a insert hole and an arcuate guide slot;

the first fixing member engages the first insert hole of the interposing member, the insert hole of the fence base part, and one of the engaging holes;

the second fixing member engages the second insert hole of the interposing member, the arcuate slot of the fence base part, and the other engaging hole;

the rotation axis is on the first fixing member;

each engaging hole comprises a longitudinal groove hole extending in the front rear direction and a plurality of transverse groove holes intersecting the longitudinal hole.

2. The cutting device according to claim 1, wherein a position of the fence in the front rear direction can be changed by moving the interposing member, the fence, the first fixing member, and the second fixing member in the front rear direction along the longitudinal groove holes.

3. The cutting device according to claim 1, wherein in a state where the fence is fixed to the interposing member by the second fixing member, the fence can be indirectly positioned on the base by moving the interposing member and the first fixing member along the longitudinal groove hole and setting the first fixing member into one of the plurality of transverse groove holes.

4. The cutting device according to claim 3, wherein the longitudinal groove holes and the transverse groove holes are provided corresponding to the first fixing member and the second fixing member, respectively; and positions of the transverse groove holes of the first engaging hole match with positions of the transverse groove holes of the second engaging hole in the front rear direction.

5. The cutting device according to claim 3, wherein a biasing member for biasing the first fixing member into one of the transverse groove holes is provided on the first fixing member and positioned in the base.

6. The cutting device according to claim 5, wherein the biasing member is provided with an arm portion that is slidably in contact with a biasing member receiving portion provided in the base.

* * * * *